United States Patent [19]

Emura et al.

[11] 4,258,165

[45] Mar. 24, 1981

[54] METHOD FOR PRODUCING VINYL CHLORIDE POLYMERS

[75] Inventors: Tomoyuki Emura; Yasuhiro Moriuchi, both of Niihama, Japan

[73] Assignees: Sumitomo Chemical Company, Limited; Sumitomo Bakelite Company, Limited, both of Japan

[21] Appl. No.: 29,512

[22] Filed: Apr. 12, 1979

[30] Foreign Application Priority Data

Apr. 12, 1978 [JP] Japan ................... 53/43469

[51] Int. Cl.$^3$ .............................. C08F 14/06
[52] U.S. Cl. ................... 526/321; 526/263; 526/322; 526/323; 526/326; 526/327; 526/329.4; 526/334; 526/344.2; 526/345
[58] Field of Search ............ 526/263, 321, 322, 323, 526/326, 327, 329.4, 334, 345, 344.2

[56] References Cited

U.S. PATENT DOCUMENTS

| | | | |
|---|---|---|---|
| 2,898,244 | 8/1959 | Martin | 526/323 |
| 3,012,011 | 12/1961 | Martin | 526/322 |
| 3,068,210 | 12/1962 | Douglas | 526/327 |
| 3,074,905 | 1/1963 | Douglas | 526/322 |
| 3,457,241 | 7/1969 | Nakamura et al. | 526/193 |
| 3,763,123 | 10/1973 | Waterman et al. | 526/323 |
| 3,806,496 | 4/1974 | Shorr et al. | 526/323 |
| 4,031,299 | 6/1977 | Wei | 526/322 |
| 4,072,806 | 2/1978 | Ravey et al. | 526/322 |

OTHER PUBLICATIONS

Journal of Polymer Sci.: Part C, Polymerization of Vinyl Chloride in the Presence of X-Lagents, Itoh et al., No. 33, pp. 135-145 (1971).

*Primary Examiner*—John Kight, III
*Attorney, Agent, or Firm*—Karl W. Flocks

[57] ABSTRACT

A method for producing a vinyl chloride resin comprising 10 to 80% by weight of tetrahydrofuran-insoluble vinyl chloride resin gel fraction and the balance of tetrahydrofuran-soluble fraction with an average polymerization degree of 1,000 or more, characterized in that vinyl chloride alone or a mixture of a major amount of vinyl chloride and a minor amount of at least one monomer copolymerizable therewith is polymerized at a temperature of 0° to 50° C. in the presence of at least one polyfunctional monomer having two or more ethylenic double bonds in the molecule until the whole monomer or monomers in the polymerization system are substantially polymerized. The thus obtained vinyl chloride resin is excellent in processability and capable of forming a molded article having a small compression permanent set.

12 Claims, No Drawings

METHOD FOR PRODUCING VINYL CHLORIDE POLYMERS

FIELD OF INVENTION

This invention relates to a method for producing vinyl chloride resin which is excellent in processability and capable of forming a molded article with a small compression permanent set.

BACKGROUND

The term "tetrahydrofuran-insoluble gel fraction" used herein means the extraction residue that results from 22-hour extraction with hot tetrahydrofuran by Soxhlet's extractor with a 350-mesh (British Standard No. 410-1962) filter, and the term "tetrahydrofuran-soluble fraction" means the portion extracted by said method.

It is known that a molding composition having a soft, rubbery touch, or so-called soft vinyl chloride resin composition, can be obtained by adding a plasticizer to a vinyl chloride resin. However, such soft vinyl chloride resins are generally poor in creep characteristics and inferior to rubber in recovery from stress, so that their applications to uses where a small compression permanent set is required such as packing are limited. For example, ordinary vulcanized rubbers have a compression permanent set (measured according to JIS K-6301 under the conditions of 70° C., 22 hrs. and 25% compression) as small as about 20 to 45% and have good creep characteristics, whereas general soft vinyl chloride resins have a compression permanent set as large as about 65 to 80%, and are poor in creep characteristics.

Heretofore, vinyl chloride resins having a high average polymerization degree, such as, for example, 3,000 or more, have been used for producing a molded article with a small compression permanent set. However, the molded article obtained therefrom usually has a compression permanent set as high as about 60% which is far from the level allowable in actual uses. Such moldings also involve many other problems in working, such as necessity of high-temperature melting for molding and requirement for heat stability and strong extrusion force.

General utility vinyl chloride resins normally contain no tetrahydrofuran-insoluble gel fraction, and if such a gel fraction exists in the vinyl chloride resin, many fish eyes are formed in the molded article obtained therefrom and also its surface smoothness is worsened because of poor processability, so that it is considered in the art that the presence of any gel fraction in vinyl chloride resin renders the product commercially valueless.

A method is also known for polymerizing vinyl chloride in the presence of a polyfunctional monomer having two or more ethylenic double bonds in the molecule to produce a vinyl chloride resin with an average polymerization degree (measured according to JIS K-6721) of 1,300 to 4,000 which is generally referred to as high polymerization grade. According to this method, however, a small quantity of gel fraction is often produced in the vinyl chloride resin depending on the type of the polyfunctional monomer used, the polymerization conditions and other factors, but since the object is definitely to obtain a vinyl chloride resin with a high polymerization degree, an effort has been made to not form such a gel fraction.

SUMMARY OF INVENTION

In view of the above, extensive studies have now been pursed aimed at obtaining a vinyl chloride resin which is free from the above defects and, as a result, a surprising fact has been discovered, i.e. that a vinyl chloride resin having a very excellent processability and matt finish and also capable of providing a molded article with a compression permanent set of not more than 50% can be obtained by polymerizing vinyl chloride in the presence of at least one polyfunctional monomer having two or more ethylenic double bonds in the molecule, at a specified temperature to such an extent that a specified amount of gel is obtained and the average polymerization degree of the soluble balance is kept higher than a specified level. The vinyl chloride may be polymerized alone or as a mixture of a major amount of vinyl chloride and a minor amount of at least one monomer copolymerizable therewith.

The object of this invention is to provide a method for producing a vinyl chloride resin which is capable of forming a molded article with a small compression permanent set of not more than about 50%, and which also has excellent processability and matt finish.

DETAILED DESCRIPTION

Thus, according to this invention, there is provided a method for producing a vinyl chloride resin having an excellent processability and matt finish and capable of forming a molded article with a compression permanent set of not more than 50%, characterized by polymerizing vinyl chloride alone or a mixture of a major amount of vinyl chloride and a minor amount of at least one monomer copolymerizable therewith, in the presence of at least one polyfunctional monomer having two or more ethylenic double bonds in the molecule, at a temperature of 0° to 50° C. until the whole monomer in the polymerization system is substantially polymerized, the vinyl chloride resin comprising 10 to 80% by weight of tetrahydrofuran-insoluble vinyl chloride resin gel fraction and the balance of tetrahydrofuran-soluble gel fraction with an average polymerization degree of 1,000 or more.

The term "vinyl chloride resin" used herein means both homopolymer of vinyl chloride and a copolymer of a major amount of vinyl chloride and a minor amount of at least one monomer copolymerizable therewith. As the monomers copolymerizable with vinyl chloride, there are exemplified fatty acid vinyl esters, vinylidene halides, alkyl acrylates, alkyl methacrylates, acrylonitrile, alkyl vinyl ethers, styrene and its derivatives, ethylene, propylene and the like.

It is essential that the vinyl chloride resin obtained according to the method of this invention has a gel content of 10 to 80% by weight, preferably 30 to 70% by weight, and the balance is composed of tetrahydrofuran-solubles with an average polymerization degree of 1,000 or more, preferably 1,200 to 7,000. If the gel content in the produced vinyl chloride resin is less than 10% by weight, the compression set cannot be reduced satisfactorily or the polymerization degree of the solubles becomes too high to maintain good processability, even if other conditions are met, while if the gel content exceeds 80% by weight, the processability of the product is excessively deteriorated.

A gel-containing vinyl chloride resin is produced according to this invention by polymerizing vinyl chloride in the presence of at least one polyfunctional monomer having two or more ethylenic double bonds in the molecule. Polyfunctional monomers are usually used for increasing the polymerization degree without forming the gel, but the use of an excess of such monomers results in formation of the gel, and in the method of this invention, such polyfunctional monomers are used for the purpose of forming the gel. Appropriate polyfunctional monomers should be selected since the average polymerization degree of the solubles and the gel content vary depending upon the kind of the polyfunctional monomer used. Examples of such polyfunctional monomers having two or more ethylenic double bonds in the molecule which are usable in this invention include diallyl phthalates such as diallyl phthalate, diallyl isophthalate, diallyl terephthalate and the like; diallyl esters of ethylenically unsaturated dibasic acids such as diallyl maleate, diallyl fumarate, diallyl itaconate and the like; diallyl esters of saturated dibasic acids such as diallyl adipate, diallyl azelate, diallyl sebacate, divinyl sebacate, and the like; diallyl ether or divinyl ether; triallyl cyanurate; triallyl isocyanurate; triallyl trimellitate; divinyl ethers such as ethylene glycol divinyl ether, butanediol divinyl ether, octadecane divinyl ether, decane divinyl ether, and the like; dimethacrylates or diacrylates of polyhydric alcohols such as ethylene glycol dimethacrylate, triethylene glycol dimethacrylate, diethylene glycol diacrylate, triethylene glycol diacrylate, and the like; trimethacrylates or triacrylates of polyhydric alcohols such as trimethylolpropane trimethacrylate, trimethylolpropane triacrylate, trimethylolethane trimethacrylate, trimethylolethane triacrylate, tetramethylolmethane triacrylate, and the like; bismethacryloyloxyethylene phthalate; 1,3,5-triacryloylhexahydrotriazine, and the like. These plyfunctional monomers may be used either singly or in combination of two or more. Although no specific limitation is imposed on the amount of such polyfunctional monomer or monomers to be added to the polymerization system, it should be kept in mind that the use of an excess of such a monomer or monomers may cause the gel content to exceed the 80 wt% level and is disadvantageous in economy, and when the monomer is used in too small an amount no gel fraction is formed. Therefore, it is usually recommended to feed said monomer or monomers in an amount of 0.01 to 10% by weight, preferably 0.2 to 2% by weight, based on the weight of the vinyl chloride monomer.

The polymerization temperature used in practicing the method of this invention ranges usually from 0° to 50° C., preferably from 20° to 48° C. This range of temperature can provide a vinyl chloride resin which has a gel content of 10–80 wt% and contains solubles having an average polymerization degree of 1,000 or more and which is also excellent in processability and capable of producing a molded article with a small compression premanent set. If the polymerization temperature exceeds 50° C., the molded article obtained from the resultant gel-containing vinyl chloride resin has a large compression permanent set, while if the polymerization temperature is lower than 0° C., an extremely long time is required for achieving the desired substantial polymerization, resulting in excessively lowered productivity and other industrial disadvantages.

In the method of this invention, the polymerization is carried out until at least 60% by weight, preferably at least 75% by weight of the supplied monomer becomes a polymer. The polymerization conversion of less than 60% by weight is not economical.

Any known polymerization method usually employed for the production of vinyl chloride polymers may be used in this invention, but it is preferred to use suspension polymerization. Any common type of catalyst may be used for suspension and bulk polymerizations, but since the polymerization is carried out at a temperature of 50° C. or less, it is preferred to use a catalyst which is active at low temperatures, for example, an oil-soluble catalyst such as diisopropyl peroxydicarbonate, diisobutyl peroxydicarbonate, acetylcyclohexylsulfonyl peroxide, t-butyl peroxypivalate, 2,3-dimethyl valeronitrile, 2,3-dimethyl-4-methoxyvaleronitrile or a mixture thereof.

Any known suspending agent usually used for suspension polymerization of vinyl chloride, such as, for example, gelatin, partially saponified polyvinyl acetate, polyvinyl alcohol, water-soluble cellulose ether or the like, may be employed for suspension polymerization in the method of this invention.

The above-mentioned vinyl chloride resin obtained according to the method of this invention is characterized by its surprisingly small compression permanent set of not more than 50%, which has never been attainable with any of the conventional vinyl chloride resins, and by excellent matt surface appearance. Further, the vinyl chloride resin according to this invention can provide a molded article with a small compression permanent set by a means which can be practiced industrially. Thus, the method of this invention is of extremely high industrial significance.

The resin properties referred to in the following Examples were determined in the following ways:

Processability

To 100 parts by weight of a vinyl chloride polymer were added 80 parts by weight of dioctyl phthalate and 5 parts by weight of tribasic lead sulfate, and the mixture was kneaded at a roll temperature of 180° C. The kneading time required till the initially powdery mixture was fused and formed into a sheet was measured (such time is hereinafter referred to as roll knitting time). The shorter the roll knitting time, the better the processability.

Compression permanent set

The sheet obtained by the above-mentioned roll working was further subjected to pressing and compression permanent set was measured according to JIS K-6301 under the conditions that the heat treatment was effected at 70° C. for 22 hours and the compression was 25%.

Matting effect

The rolled sheet which was evaluated in processability in the above-mentioned manner was cut into pellets and then extruded into a tape by means of an extruder. The matting condition of the molded article was rated according to the following criterion:

(1) Excellent: Appearance is uniform and the matt surface is remarkable.
(2) Good: Appearance is uniform and the matt surface is noted.
(3) Bad: Appearance and flow are non-uniform and the matt surface is indistinct.

The method of this invention is described in further detail by the following Examples which are merely illustrative and not restrictive.

EXAMPLE 1

Into a 100-liter glass-lined autoclave were fed 44.4 kg of deionized water, 600 ml of a 5 wt% aqueous solution of partially saponified polyvinyl acetate with a saponification degree of 70 mol% and an average polymerization degree of 670, 18 g of a 50 wt% toluene solution of diisobutyl peroxydicarbonate and 105 g of diallyl phthalate (0.35 wt% based on the weight of the vinyl chloride monomer fed). The pressure of the autoclave was reduced to 50 mmHg, to remove oxygen, and 30 kg of vinyl chloride monomer was then fed, after which the mixture was heated to the temperatures shown in Table 1 under agitation to commence the polymerization. The polymerization was stopped when the pressure in the autoclave dropped by 1 kg/cm²G from the pressure at the time of start of polymerization. After purging the unreacted vinyl chloride monomer, the contents were taken out, dehydrated and dried.

The polymerization time, the polymerization conversion and the properties of the polymers obtained are shown in Table 1.

It is noted from Table 1 that if the polymerization temperature exceeds 50° C., the compression permanent set of the molded article from the resin obtained is unfavorably increased.

EXAMPLE 2

Into a 100-liter glass-lined autoclave were fed 44.4 kg of deionized water, 600 ml of a 5 wt% aqueous solution of partially saponified polyvinyl acetate with a saponification degree of 70 mol% and an average polymerization degree of 670, 18 g of a 50 wt% toluene solution of diisobutyl peroxydicarbonate and various amounts of diallyl phthalate shown in Table 2. The pressure of the autoclave was reduced to 50 mmHg to remove oxygen, and 30 kg of vinyl chloride monomer was fed, after which the mixture was heated to 43° C. under agitation to commence the polymerization. The polymerization was stopped at the point when the pressure in the autoclave dropped by 1 kg/cm²G from the pressure at the time of start of polymerization, and after purging the unreacted vinyl chloride monomer, the contents were taken out, dehydrated and dried. The polymerization time, the polymerization conversion and the properties of the polymers obtained are shown in Table 2.

TABLE 1

| Run No. | Polymerization temp. (°C.) | Polymerization time (hr) | Polymerization conversion (%) | Gel content (wt %) | Average polymerization degree of solubles | Compression permanent set (%) | Matting effect | Processability (roll knitting time) (min) |
|---|---|---|---|---|---|---|---|---|
| 1 | 25 | 40 | 61.1 | 78.8 | 2600 | 41 | Excellent | 48 |
| 2 | 28 | 33 | 68.8 | 75.0 | 1900 | 42 | Excellent | 40 |
| 3 | 35 | 23 1/6 | 71.1 | 60.1 | 1730 | 43 | Excellent | 20 |
| 4 | 43 | 13.5 | 76.0 | 55.1 | 1620 | 46 | Excellent | 15 |
| 5 | 48 | 8.5 | 76.3 | 38.0 | 1690 | 48 | Excellent | 11 |
| 6 (Comparative Example) | 55 | 5 5/6 | 76.8 | 25.0 | 1620 | 54 | Good | 10 |

TABLE 2

| Run No. | Polymerization temp. (°C.) | Amount of diallyl phthalate added (wt %)* | Polymerization time (hr) | Polymerization conversion (%) | Gel content (%) | Average polymerization degree of solubles | Compression permanent set (%) | Matting effect | Processability (roll knitting time) (min) |
|---|---|---|---|---|---|---|---|---|---|
| 7 (Comparative Ex.) | 43 | 0 | 9.5 | 76.8 | 0.0 | 1990 | 64 | Non-uniform appearance | 5 |
| 8 (Comparative Ex.) | 43 | 0.1 | 11.5 | 75.6 | 4.8 | 3300 | 53 | Good | 9 |
| 9 | 43 | 0.2 | 12 5/6 | 75.1 | 33.3 | 2510 | 47 | Excellent | 11 |
| 10 | 43 | 0.3 | 13 1/12 | 77.3 | 42.4 | 2160 | 45 | " | 14 |
| 11 | 43 | 0.5 | 14 7/12 | 76.5 | 75.4 | 1130 | 43 | " | 47 |
| 12 (Comparative Ex.) | 43 | 1.0 | 17 1/6 | 75.2 | 94.0 | 550 | 41 | " | More than 60 |

*Wt % is based on the weight of the vinyl chloride monomer fed.

It is apparent from Table 2 that no satisfactory improving effect on compression permanent set is obtained when the gel content is less than 10 wt% while the processability is deteriorated when the gel content exceeds 80 wt%.

EXAMPLE 3

Into a 100-liter glass-lined autoclave were charged 44.4 kg of deionized water, 600 ml of a 5 wt% aqueous solution of partially saponified polyvinyl acetate with a saponification degree of 70 mol% and an average polymerization degree of 670, 18 g of a 50 wt% toluene solution of diisobutyl peroxydicarbonate and various amounts of triallyl isocyanurate as shown in Table 3, and the pressure of the autoclave was reduced to 50 mmHg to remove oxygen, after which 30 kg of vinyl chloride monomer was supplied and the mixture was heated to 45° C. under agitation to start the polymerization. The polymerization was stopped when the pressure in the autoclave dropped by 1 kg/cm$^2$G from the pressure at the time of start of polymerization. After purging the unreacted vinyl chloride monomer, the contents were taken out, dehydrated and dried. The polymerization time, the polymerization conversion and the properties of the polymers obtained are shown in Table 3.

It is understood from Table 3 that when the average polymerization degree of the solubles is less than 1,000, there is hardly obtainable a polymer which can provide a molded article with a small compression permanent set.

EXAMPLE 4

Into a 100-liter glass-lined autoclave were charged 44.4 kg of deionized water, 600 ml of a 5 wt% aqueous solution of partially saponified polyvinyl acetate with a saponification degree of 70 mol% and an average polymerization degree of 670, 18 g of a 50 wt% toluene solution of diisobutyl peroxydicarbonate and various amounts of polyfunctional monomers as shown in Table 4, and the pressure of the autoclave was reduced to 50 mmHg to remove oxygen, after which 30 kg of vinyl chloride monomer was supplied and the mixture was heated to 43° C. under agitation to commence the polymerization. The polymerization was stopped at the point when the pressure in the autoclave dropped by 1 kg/cm$^2$G from the pressure at the time of start of polymerization, and after purging the unreacted vinyl chloride monomer, the contents were taken out, dehydrated and dried. The polymerization time, the polymerization conversion and the properties of the obtained polymers are shown in Table 4.

TABLE 3

| Run No. | Polymerization temp. (°C.) | Amount of triallyl isocyanurate added (wt %)* | Polymerization time (hr) | Polymerization conversion (%) | Gel content (%) | Average polymerization degree of solubles | Compression permanent set (%) | Matting effect | Processability (roll knitting time) (min) |
|---|---|---|---|---|---|---|---|---|---|
| 13 (Comparative Ex.) | 45 | 0.05 | 10 2/3 | 76.1 | 1.2 | 2300 | 57 | Good | 12 |
| 14 (Comparative Ex.) | 45 | 0.1 | 11.5 | 77.8 | 4.5 | 1900 | 56 | Good | 13 |
| 15 | 45 | 0.2 | 12 2/3 | 76.3 | 16.6 | 1300 | 49 | Excellent | 13 |
| 16 | 45 | 0.3 | 13.0 | 75.1 | 21.1 | 1100 | 48 | " | 14 |
| 17 (Comparative Ex.) | 45 | 0.4 | 14.0 | 77.1 | 31.3 | 900 | 52 | " | 15 |
| 18 (Comparative Ex.) | 45 | 1.0 | 16 1/6 | 76.7 | 40.1 | 800 | 53 | " | 16 |

*Wt % is based on the weight of the vinyl chloride monomer fed.

TABLE 4

| Run No. | Polyfunctional monomer Name of compound | Amount added (wt %)* | Polymerization time (hr) | Polymerization conversion (%) | Polymer obtained Gel content (%) | Avg. polymerization degree of solubles | Compression permanent set (%) | Matting effect | Processability (roll knitting time) (min) |
|---|---|---|---|---|---|---|---|---|---|
| 19 | Triallyl isocyanurate | 0.4 | 13 1/12 | 75.1 | 60 | 1310 | 43 | Excellent | 15 |
| 20 | Diallyl adipate | 0.4 | 12 5/6 | 76.4 | 38 | 2100 | 47 | Excellent | 12 |
| 21 | Diallyl ether | 1.0 | 17.5 | 75.5 | 35 | 2400 | 49 | Excellent | 12 |
| 22 | Triallyl cyanurate | 0.5 | 14 1/6 | 76.8 | 53 | 1670 | 44 | Excellent | 14 |
| 23 | Triallyl trimelli- | 0.2 | 11.5 | 75.7 | 58 | 1600 | 42 | Excellent | 15 |

TABLE 4-continued

| | Polyfunctional monomer | | Polymer- ization time (hr) | Polymer- ization conver- sion (%) | Polymer obtained | | Properties | | |
|---|---|---|---|---|---|---|---|---|---|
| | | | | | | | Compres- sion | | Process- ability |
| Run No. | Name of compound | Amount added (wt %)* | | | Gel con- tent (%) | Avg. poly- merization degree of solubles | perma- nent set (%) | Matting effect | (roll knitting time) (min) |
| | tate | | | | | | | | |
| 24 | Octadecane divinyl ether | 1.0 | 15.5 | 76.1 | 41 | 4260 | 45 | Excel- lent | 18 |
| 25 | Ethylene glycol di- methacryl- ate | 1.0 | 14.5 | 76.6 | 39 | 2050 | 48 | Excel- lent | 13 |
| 26 | Trimethylol- propane trimeth- acrylate | 0.5 | 13 5/6 | 76.1 | 35 | 2500 | 48 | Excel- lent | 13 |
| 27 | Bis-meth- acryloyl- oxyethylene phthalate | 0.6 | 14.0 | 76.3 | 40 | 2000 | 46 | Excel- lent | 15 |

*Wt % is based on the weight of the vinyl chloride monomer fed.

It can be learned from Table 4 that use of a polyfunctional monomer or monomers having two or more ethylenic double bonds in the molecule is most effective in the method of this invention.

What is claimed is:

1. A method for producing a vinyl chloride resin comprising suspension polymerizing vinyl chloride alone or a mixture of a major amount of vinyl chloride and a minor amount of at least one monomer copolymerizable therewith, in the presence of an amount sufficient to form 10–80 wt. % of gel content in the product of at least one polyfunctional monomer having two or more ethylenic double bonds in the molecule, at a temperature of 0° to 50° C. until the whole monomer in the polymerization system is substantially polymerized, and obtaining vinyl chloride resin comprising 10 to 80% by weight of tetrahydrofuran-insoluble vinyl chloride resin gel fraction and the balance of tetrahydrofuran-soluble fraction with an average polymerization degree of 1,000 or more.

2. A method according to claim 1, wherein the amount of the polyfunctional monomer added is 0.01 to 10% by weight based on the weight of the vinyl chloride monomer.

3. A method according to claim 1, wherein the amount of the polyfunctional monomer added is 0.2 to 2% by weight based on the weight of the vinyl chloride monomer.

4. A method according to any one of claims 1 to 3, wherein the polyfunctional monomer is at least one compound selected from the group consisting of diallyl esters of phthalic acid, diallyl esters of ethylenically unsaturated dibasic acids, diallyl esters of saturated dibasic acids, diallyl ether, triallyl cyanurate, triallyl isocyanurate, triallyl trimellitate, divinyl ethers, diacrylic and dimethacrylic esters of polyhydric alcohols, triacrylic and trimethacrylic esters of polyhydric alcohols, bis-methacryloyloxyethylene phthalate and 1,3,5-triacryloylhexahydrotriazine.

5. A method according to any one of claims 1 to 3, wherein the polyfunctional monomer is at least one compound selected from the group consisting of diallyl phthalate, diallyl isophthalate, diallyl terephthalate, diallyl maleate, diallyl fumarate, diallyl itaconate, diallyl adipate, diallyl azelate, diallyl sebacate, diallyl ether, triallyl cyanurate, triallyl isocyanurate, triallyl trimellitate, ethylene glycol divinyl ether, butanediol divinyl ether, octadecane divinyl ether, decane divinyl ether, ethylene glycol dimethacrylate, dimethylene glycol diacrylate, triethylene glycol diacrylate, trimethylolpropane trimethacrylate, trimethylolpropane triacrylate, trimethylolethane trimethacrylate, trimethylolethane triacrylate, tetramethylolmethane triacrylate, bis-methacryloloxyethylene phthalate and 1,3,5-triacryloylhexahydrotriazine.

6. A method according to claim 1, wherein the polymerization temperature is 20° to 48° C.

7. A method according to any one of claims 1 to 3 or claim 6, wherein vinyl chloride alone is polymerized.

8. A method according to any one of claims 1 to 3 or claim 6, wherein a mixture of a major amount of vinyl chloride and a minor amount of at least one monomer copolymerizable therewith is polymerized.

9. A method according to claim 8, wherein the monomer copolymerizable with vinyl chloride is at least one monomer selected from the group consisting of fatty acid vinyl esters, vinylidene halides, alkyl acrylates, alkyl methacrylates, acrylonitrile, alkyl vinyl ethers, styrene, styrene derivatives, ethylene and propylene.

10. A product obtained by the method of any one of claims 1–3 or 6, and comprising a vinyl chloride polymer of 10–80% tetrahydrofuran-insoluble gel fraction and 90-20% tetrahydrofuran soluble fraction with an average polymerization degree of 1200 to 7000, said polymer having good processability and being moldable to provide a molded product having a permanent set no greater than about 50% and a good matt finish.

11. A product according to claim 10 having a roll knitting time of no more than 60 min.

12. A shaped product obtained by molding the product of claim 10.

* * * * *